United States Patent

Nodera et al.

Patent Number: 6,001,929

Date of Patent: *Dec. 14, 1999

[54] POLYCARBONATE RESIN COMPOSITION

[75] Inventors: Akio Nodera; Jiro Chiba, both of Ichihara, Japan

[73] Assignee: Idemitsu Petrochemical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/742,853

[22] Filed: Nov. 1, 1996

Related U.S. Application Data

[63] Continuation of application No. 08/493,245, Jun. 22, 1995, abandoned.

[30] Foreign Application Priority Data

Jul. 15, 1994 [JP] Japan ................................. 6-164110

[51] Int. Cl.[6] ....................................................... C08L 69/00
[52] U.S. Cl. ........................... 525/92 E; 525/104; 525/464
[58] Field of Search ................................ 525/104, 92 E, 525/464

[56] References Cited

U.S. PATENT DOCUMENTS

| | | | |
|---|---|---|---|
| 4,391,935 | 7/1983 | Bialous et al. | 524/82 |
| 4,473,685 | 9/1984 | Mark | 525/146 |
| 4,600,632 | 7/1986 | Paul et al. | 428/220 |
| 5,451,632 | 9/1995 | Okumura et al. | 524/537 |

FOREIGN PATENT DOCUMENTS

| | | |
|---|---|---|
| 0 283 776 | 9/1988 | European Pat. Off. . |
| 0 386 511 | 9/1990 | European Pat. Off. . |
| 0 522 753 | 1/1993 | European Pat. Off. . |
| 0 524 730 | 1/1993 | European Pat. Off. . |
| 0 595 141 | 5/1994 | European Pat. Off. . |
| 41 33 259 | 4/1993 | Germany . |

OTHER PUBLICATIONS

Schnell, Herman, Chemisrty and Physics of Polycarbonates, Interscience Publishers, 1964, p. 156.

*Primary Examiner*—Margaret W. Glass
*Attorney, Agent, or Firm*—Oblon, Spivak, McClelland, Maier & Neustadt, P.C.

[57] ABSTRACT

There is disclosed a polycarbonate resin composition which comprises an (A) polycarbonate-polyorganosiloxane copolymer, a (B) polycarbonate resin and a (C) polytetrafluoroethylene which has fibril forming capability and an average molecular weight of at least 500,000 wherein the amount of the polyorganosiloxane moiety contained in the component (A) is 0.1 to 2.0% by weight based on the total amount of the components (A) and (B). The resin composition is excellent in flame retardancy, thermal stability and fluidity while preventing melt dripping at the time of combustion. Accordingly, the resin composition is favorably used in the application field of office automation machinery and equipment, electric and/or electronic field, etc.

7 Claims, No Drawings

POLYCARBONATE RESIN COMPOSITION

This application is a Continuation of application Ser. No. 08/493,245, filed on Jun. 22, 1995, now abandoned.

BACKGROUND OF THE INVENTION

1. Field of the Invention

The present invention relates to a polycarbonate resin composition. More particularly, it pertains to a polycarbonate resin composition excellent in thermal stability, fluidity and flame retardancy.

2. Description of Related Arts

A polycarbonate resin is excellent in mechanical strength, particularly impact strength, electrical properties, transparency and the like and is widely utilized in a variety of fields of office automation machinery, electric and electronic machinery, automobiles, and the like. Some of the above-mentioned utilization fields typified by the fields of office automation machinery and electric and electronic machinery are required to have flame retardancy.

Of various thermoplastic resins, polycarbonate is said to have a high oxygen index and in general, a self-fire-extinguishing property.

However, a polycarbonate resin to be utilized in the field of office automation machinery, electric/electronic machinery or the like is required to have such a high level of flame retardancy as level V-0 in general in terms of UL 94 standard. In order to impart flame retardancy to the polycarbonate resin, a flame retardant and/or a flame retardant aid is added to the polycarbonate resin.

On the other hand, it is known that a polycarbonate-polyorganosiloxane copolymer or a mixture of a polycarbonate-polyorganosiloxane copolymer and a polycarbonate resin has flame retardative performance higher than that of the polycarbonate resin itself. Nevertheless, a polycarbonate-polyorganosiloxane copolymer alone has not sufficient flame retardative performance and accordingly there are disclosed polycarbonate resin compositions that are to be used in combination with various flame retardants. (For example, refer to Japanese Patent Application Laid-Open Nos. 289059/1988, 210462/1989, 200862/1991, 202465/1992, etc.)

However, the prior arts that have heretofore been disclosed suffer the disadvantage of causing melt dripping at the time of combustion when the polycarbonate is imparted with high fluidity. In addition, a composition incorporated with a flame retardant or a bromine compound suffers the defect of its generally being poor in thermal stability.

Under such circumstances, intensive research and investigation were accumulated by the present inventors in order to develop a polycarbonate resin composition which is excellent in thermal stability and capable of being highly fluidized.

As a result it has been found that a maximum oxygen index is manifested by a polycarbonate-polyorganosiloxane copolymer or a mixture of a polycarbonate-polyorganosiloxane copolymer and a polycarbonate resin provided the proportion of the polyorganosiloxane moiety in the composition is 0.1 to 2.0% by weight, and that the combined use of the aforesaid composition and a specific polytetrafluoroethylene can prevent melt-dripping at the time of combustion, whereby a polycarbonate resin composition having the objective properties is obtained. The present invention has been accomplished by the above-mentioned finding and information.

SUMMARY OF THE INVENTION

Specifically the present invention provide a polycarbonate resin composition which comprises an (A) polycarbonate-polyorganosiloxane copolymer, a (B) polycarbonate resin and a (C) polytetrafluoroethylene which has fibril forming capability and an average molecular weight of at least 500,000 wherein the amount of the component (A) is 5 to 100% by weight based on the total amount of the components (A) and (B), the amount of the component (B) is 95 to 0% by weight based on the total amount of the components (A) and (B), the amount of the polyorganosiloxane moiety contained in the component (A) is 0.1 to 2.0% by weight based on the total amount of the components (A) and (B) and the amount of the component (C) is 0.05 to 1.0 part by weight based on 100 parts by weight of the total amount of the components (A) and (B).

DESCRIPTION OF PREFERRED EMBODIMENT

There are available a variety of the polycarbonate-polyorganosiloxane copolymers (hereinafter abbreviated to "PC-PDMS copolymer") as the component (A) which is one of the constituents of the resin composition according to the present invention. The preferred copolymer among them is that composed of the polycarbonate moiety having the repeating unit represented by the general formula (1)

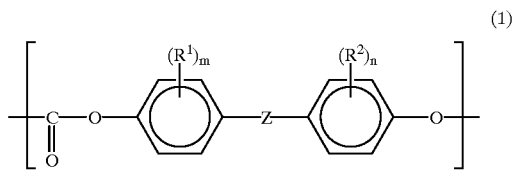

and the polyorganosiloxane moiety having the repeating unit represented by the general formula (3)

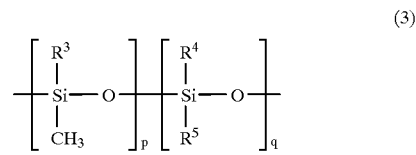

wherein $R^1$ and $R^2$ are each a halogen atom exemplified by chlorine atom, bromine atom and iodine atom, an alkyl group having 1 to 8 carbon atoms exemplified by methyl group, ethyl group, propyl group, isopropyl group, butyl group such as n-butyl group, isobutyl group, sec-butyl group and tert-butyl group, pentyl group, hexyl group, heptyl group and octyl group; m and n are each an integer form 0 to 4; $R^1$ may be the same as or different from each other when m is 2 to 4; $R^2$ may be the same as or different from each other when n is 2 to 4; Z is an alkylene group having 1 to 8 carbon atoms such as methylene group, ethylene group, propylene group, butylene group, pentylene group and hexylene group, an alkylidene group having 2 to 8 carbon atoms such as ethylidene group and isopropylidene, a cycloalkylene group having 5 to 15 carbon atoms such as cyclopentylene group and cyclohexylene group, a cycloalkylidene group such as cyclopentylidene group and cyclohexylidene group, $-SO_2-$, $-SO-$, $-S-$, $-O-$, $-CO-$ or a bond represented by the general formula (2) or (2');

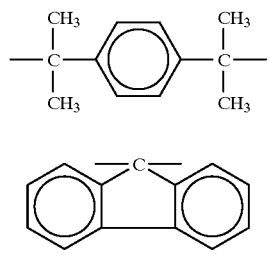

(2)

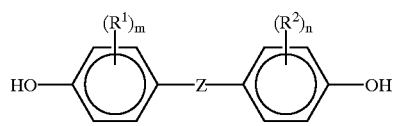

(2')

wherein $R^3$, $R^4$ and $R^5$ are each a hydrogen atom, an alkyl group having 1 to 5 carbon atoms such as methyl group, ethyl group, propyl group, n-butyl group and isobutyl group, or a phenyl group; and p and q are each an integer of 0 or 1 or greater.

The degree of polymerization of the PC (polycarbonate) moiety is preferably 3 to 100 and that of the polyorganosiloxane moiety is preferably 2 to 500.

The above-mentioned PC-PDMS copolymer is a block copolymer which is composed of the PC moiety having the repeating unit represented by the aforesaid general formula (1) and the polyorganosiloxane moiety having the repeating unit represented by the general formula (3) and which has a viscosity-average molecular weight of 10,000 to 40,000, preferably 12,000 to 35,000.

The PC-PDMS copolymer can be produced by the steps of dissolving a polycarbonate oligomer prepared in advance which constitutes polycarbonate moiety (hereinafter abbreviated to "PC oligomer) as well as a polyorganosiloxane which has a reactive group at a terminal thereof, constitutes polyorganosiloxane moiety, and is exemplified by polydialkylsiloxane such as polydimethylsiloxane (PDMS), polydiethylsiloxane, polymethylphenylsiloxane or the like in a solvent such as methylene chloride, chlorobenzene and chloroform to form a solution; adding aqueous solution of sodium hydroxide with bisphenol A to the resultant solution; and subjecting the mixture to interfacial polycondensation reaction by the use of triethylamine or trimethylbenzylammonium chloride as a catalyst. There is also usable the polycarbonate-polyorganosiloxane (PC-PDMS) copolymer which is produced by the process described in Japanese Patent Publication Nos.30108/1969 and 20510/1970.

The PC oligomer having the repeating unit represented by the general formula (4) can easily be produced by a solvent process, that is, by the reaction of a dihydric phenol represented by the general formula (4)

(4)

HO—⟨(R$^1$)$_m$⟩—Z—⟨(R$^2$)$_n$⟩—OH wherein $R^1$, $R_2$, Z, m and n are each as previously defined, with a carbonate precursor such as phosgene or a carbonic acid ester in a solvent such as methylene chloride in the presence of a known acid receptor and a molecular weight modifier.

That is to say, the aforesaid PC oligomer can be produced by the reaction of the dihydric phenol with a carbonate precursor such as phosgene or by the transesterification of the dihydric phenol with a carbonate precursor such as a diphenyl carbonate in the presence of a publicly known acid receptor and a molecular weight modifier.

The are available a variety of dihydric phenols as represented by the general formula (4) described above. In particular, 2,2-bis(4-hydroxyphenyl)propane(bisphenol A) is preferable. As the dihydric phenol other than bisphenol A, mention is made of bis(4-hydroxyphenyl)alkane; 1,1-(4-hydroxyphenyl)methane; 1,1-(4-hydroxyphenyl)ethane; 4,4'-dihydroxydiphenyl; bis(4-hydroxyphenyl)cycloalkane; bis(4-hydroxyphenyl) oxide; bis(4-hydroxyphenyl) sulfide; bis(4-hydroxyphenyl) sulfone; bis(4-hydroxyphenyl) sulfoxide; bis(4-hydroxyphenyl) ether; and bis(4-hydroxyphenyl) ketone, each being other than bisphenol A. As a dihydric phenol other than that represented by the general formula (4), mention is made of hydroquinone. The above-mentioned dihydric phenol may be employed alone or in combination with at least one of others.

Examples of the carbonic acid ester compound include a diaryl carbonate such as diphenyl carbonate, and dialkyl carbonate such as dimethyl carbonate and diethyl carbonate.

Any kind of molecular weight modifier which is generally used in the production of PC can be employed in the present invention. Examples of the usable molecular weight modifier include a monohydric phenol such as phenol, p-cresol, p-tert-butylphenol, p-tert-octylphenol, p-cumylphenol and nonylphenol.

The PC oligomer to be used for the production of the PDMS copolymer may be a homopolymer containing one kind of the dihydric phenol mentioned above or a copolymer containing at least two different dihydric phenols or may be a thermoplastic random branched PC which is obtained by using a multifunctional aromatic compound in combination with any of the above-mentioned dihydric phenol.

In the next place, the PC resin as the component (B) which is one of the constituents of the PC resin composition according to the present invention is not specifically limited, but can easily be produced by reacting a dihydric phenol with phosgene or a carbonic acid ester. Specifically, it can be produced, for example, by the reaction of the dihydric phenol with a carbonate precursor such as phosgene or by the transesterification of the dihydric phenol with a carbonate precursor such as a diphenyl carbonate in the presence of a publicly known acid receptor and a molecular weight modifier.

The dihydric phenol for the production of the component (B) may be the same as or different from the compound represented by the general formula (4). The PC resin as the component (B) may be a homopolymer consisting of one kind of the dihydric phenol or a copolymer composed of at least two kinds of the dihydric phenols, or may be a thermoplastic random branched PC which is obtained by using a multifunctional aromatic compound in combination with any of the above-mentioned dihydric phenol.

Examples of the carbonic acid ester compound include a diaryl carbonate such as diphenyl carbonate, and a dialkyl carbonate such as dimethyl carbonate and diethyl carbonate.

Any kind of molecular weight modifier which is generally used in the production of PC can be employed in the present invention. Examples of the usable molecular weight modifier include a monohydric phenol such as phenol, p-cresol, p-tert-butylphenol, p-tert-octylphenol, p-cumylphenol and nonylphenol.

With regard to the blending amounts of the component (A) and the component (B), the blending amount of the component (A) is 5 to 100%, preferably 10 to 100% by weight based on the total amount of the components (A) and (B), and the blending amount of the component (B) is 95 to 0%, preferably 90 to 0% by weight based on the same. A blending amount of the component (A) less than 5% by weight, namely that of the component (B) more than 95% by weight brings about poor dispersibility of the polyorganosiloxane and failure to attain sufficient flame retardancy. On the other hand, blending amounts of the components (A) and (B) within the preferable range enable the production of the PC resin composition having satisfactory flame retardancy.

The amount of the polyorganosiloxane contained in the component (A) is 0.1 to 2.0%, preferably 0.5 to 1.5% by weight based on the total amount of the components (A) and (B). An amount thereof less than 0.1% by weight or more than 2.0% by weight results in failure to achieve sufficient oxygen index and manifest the objective flame retardancy. A blending amount thereof within the preferred range enables the production of the PC resin composition having favorable oxygen index and excellent flame retardancy.

The polytetrafluoroethylene (hereinafter abbreviated to "PTFE") as the component (C) according to the present invention imparts melt dripping preventive effect to the PC resin composition, and the use of PTFE having fibril forming capability can impart high flame retardancy thereto. It is necessary that the component (C) has an average molecular weight of at least 500,000, preferably in the range of 500,000 to 10,000,000, and more preferably in the range of 1,000,000 to 10,000,000.

The blending amount of the component (C) is 0.05 to 1.0, preferably 0.1 to 0.5 part by weight based on 100 parts by weight of the total amount of the components (A) and (B). An amount thereof more than 1.0 part by weight is unfavorable, since it not only exerts adverse influence on the impact resistance and appearance of the molded articles produced from the PC resin composition, but also causes the strand discharge to pulsate when the components are extruded, thereby disenabling stable pellet production, whereas that less than 0.05% by weight can not prevent melt-dripping sufficiently. Within the preferred range of a blending amount thereof, melt-dripping can be prevented and the objective composition can be produced.

The PTFE having fibril forming capability as the component (C) according to the present invention is not specifically limited. There may be employed a PTFE classified into Type-3 by the ASTM standard, which is specifically exemplified by Teflon 6-J (trade name; produced by Dupont-Mitsui Fluorochemicals Co., Ltd.), Polyflon D-1 and Polyflon F-103 (trade name; produced by Daikin Industries Ltd.) Examples of the usable PTFE other than those of Type 3 include Algoflon F5 (trade name; produced by MonTefluos Co., Ltd.) and Polyflon MPA FA-100 (trade name; produced by Daikin Industries Ltd.)

The above-mentioned PTFE may be used in combination with at lest one of others.

The aforestated PTFE having fibril forming capability can be produced, for example, by polymerizing tetrafluoroethylene under a pressure of 1 to 100 psi (0.07 to 7 kg/cm$^2$G) at a temperature of 0 to 200° C., preferably 20 to 100° C. in an aqueous solvent in the presence of sodium, potassium or ammonium peroxydisulfide.

The resin composition according to the present invention may be compounded, when necessary, with any of various types of inorganic fillers and additives, other kinds of synthetic resins or elastomers, or the like (hereinafter abbreviated to the component (D)) in addition to the above-mentioned components (A), (B) and (C) to the extent that such compounding does not impair the object of the present invention.

As the aforesaid inorganic fillers to be compounded for the purpose of enhancing the mechanical strength and durability of the PC resin composition or as an extender, mention may be made of glass fiber(GF), carbon fiber, glass beads, glass flake, carbon black, calcium sulfate, calcium carbonate, calcium silicate, titanium oxide, alumina, silica, asbestos, talc, clay, mica, powdery quartz and the like. As the aforesaid additive, mention may be made of an antioxidant of hindered phenol base, phosphorus base such as phosphorous ester base and phosphoric ester base or the like; a ultraviolet absorber of benzotriazole base or benzophenone base; an external lubricant such as an aliphatic carboxylic acid ester, paraffin, silicone oil, polyethylene wax or the like; a mold release agent; an antistatic agent, a coloring agent; and the like.

Examples of the other kinds of synthetic resin include polyethylene, polypropylene, polystyrene, AS resin (acrylonitrile-styrene copolymer, ABS resin (acrylonitrile-butadiene-styrene copolymer) and poly(methyl methacrylate). Examples of the elastomers include isobutylene-isoprene rubber, styrene-butadiene rubber, ethylene-propylene rubber and acrylic elastomer.

The resin composition according to the present invention can be prepared by compounding to above-mentioned components (A), (B) and (C) and, when necessary, the component (D) and kneading the resultant compound.

The above-mentioned compounding and kneading can be carried out by the usual means such as ribbon blender, Henschel mixer, Banbury mixer, drum tumbler, single screw extruder, twin screw extruder, cokneader or multi-screw extruder. The heating temperature at the time of kneading is selected usually in the range of 240 to 320° C.

The PC resin composition thus obtained can be molded by any of the various kinds of conventional methods of molding such as injection molding, blow molding, extrusion molding, compression molding, calender molding, rotational molding and the like to provide molded articles for a chassis of office automation machinery and equipment and molded articles in the electric/electronic fields.

The present invention can provide a flame retardative polycarbonate resin composition excellent in thermal stability and fluidity while preventing melt dripping at the time of combustion, since the composition is completely free from a flame retarding agent or a bromine compound. Accordingly, the PC resin composition according to the present invention is favorably used in the application field of office automation machinery and equipment, electric and/or electronic field and the like.

The present invention will be described in more detail with reference to preparation examples, comparative examples and working examples, which however, shall not be construed to limit the present invention thereto.

PREPARATION EXAMPLE 1

[Preparation of a Polycarbonate Oligomer (a PC Oligomer-A)]

In 400 liter of 5% by weight aqueous solution of sodium hydroxide, 60 kg of bisphenol A was dissolved to prepare an aqueous sodium hydroxide solution of bisphenol A. Through a tubular reactor having 100 mm inner diameter and 10 m length, the aqueous sodium hydroxide solution of bisphenol A prepared above and kept at room temperature and methylene chloride were passed at a flow rate of 138 liter/hr and 69 liter/hr, respectively, via an orifice plate. In parallel with these streams, phosgene was passed through the reactor at a flow rate of 10.7 kg/hr. The reaction was carried out for 3 hours continuously. The tubular reactor had the structure of double tubes and cooling water was passed through a jacket part to keep the discharge temperature of the reaction solution at 250° C. The pH value of the discharged solution was controlled in the range of 10 to 11. The reaction solution thus obtained was left standing. Then, the separated water phase was removed and the methylene chloride phase (220 liter) was collected, and further incorporated with 170 liter of methylene chloride under sufficient stirring to obtain PC oligomer having 317 g/liter concentration. The degree of polymerization of the resultant PC oligomer was 3 to 4.

PREPARATION EXAMPLE 2-1

[Synthesis of a Reactive Polydimethylsiloxane (PDMS-A)]

Octamethylcyclotetrasiloxane in an amount of 1483 g, 96 g of 1,1,3,3-tetramethyldisiloxane and 35 g of 86% by weight of sulfuric acid were mixed together and the mixture was stirred for 17 hours at room temperature. Then, the oil phase was separated and 25 g of sodium hydrogen carbonate was added to the separated oil phase. The mixture was stirred for 1 hour. After filtration, the reaction solution was distilled under a vacuum of 3 torr at 150° C. to remove low boiling point components, and an oily product.

To a mixture of 60 g of 2-allylphenol and 0.0014 g of platinum in the form of a complex compound of platinum chloride and an alcoholate, 294 g of the oily product obtained above was added a temperature of 90° C. The mixture thus obtained was stirred for 3 hours while it was kept at a temperature of 90 to 115° C. The reaction product was extracted with methylene chloride and the extract was washed with an 80% by weight aqueous methanol 3 times to remove excess amount of 2-allylphenol. The product was dried with anhydrous sodium sulfate and then the solvent was removed under vacuum by heating up to a temperature of 115° C.

The resultant PDMS terminated with phenol was found to have 30 repeating units of dimethylsilanoxy group by NMR measurement.

PREPARATION EXAMPLE 2-2

[Preparation of Reactive PDMS-B]

The procedure in Preparation Example 2-1 was repeated except that the amount of 1,1,3,3-tetramethyldisiloxane used was 18.1 g. The resultant PDMS terminated with phenol was found to have 150 repeating units of dimethylsilanoxy group by NMR measurement.

PREPARATION EXAMPLE 3-1

[Preparation of a Polycarbonate-Polydimethylsiloxane (PC-PDMS Copolymer $A_1$)]

The reactive PDMS obtained in Preparation Example 2-1 in an amount of 185 g was dissolved into 2 liter of methylene chloride and the solution was mixed with 10 liter of the PC oligomer obtained in Preparation Example-1. To this solution, a solution prepared by dissolving 26 g of sodium hydroxide in 1 liter of water and 5.7 milliliter of triethylamine were added and the mixture was kept stirring for 1 hour at room temperature at 500 rpm to proceed with reaction. After the completion of the reaction, a solution prepared by dissolving 600 g of bisphenol A in 5 liter of a 5.2% by weight aqueous sodium hydroxide solution, 8 liter of methylene chloride and 81 g of p-tert-butylphenol were added and the mixture was kept stirring for 2 hours at room temperature at 500 rpm. After the completion of the reaction, 5 liter of methylene chloride was added and the solution was washed with water by using 5 liter of water, with an alkali by using 5 liter of a 0.01 N aqueous sodium hydroxide solution, with an acid by using 5 liter of 0.1 N aqueous solution of hydrochloric acid and with water by using 5 liter of water, successively. Finally, methylene chloride was removed to afford a PC-PDMS copolymer of chip form.

PREPARATION EXAMPLE 3-2

[Preparation of PC-PDMS Copolymer $A_2$]

The procedure in Preparation Example 3-1 was repeated to produce a PC-PDMS copolymer of chip form except that p-tert-butylphenol was used in an amount of 113 g in place of 81 g.

PREPARATION EXAMPLE 3-3

[Preparation of PC-PDMS Copolymer $A_3$]

The procedure in Preparation Example 3-1 was repeated to produce a PC-PDMS copolymer of chip form except that the reactive PDMS-A was used in an amount of 42 g in place of 185 g and that p-tert-butylphenol was used in an amount of 113 g in place of 81 g.

PREPARATION EXAMPLE 3-4

[Preparation of PC-PDMS Copolymer $A_4$]

The procedure in Preparation Example 3-1 was repeated to produce a PC-PDMS copolymer of chip form except that the reactive PDMS-B was used in place of the reactive PDMS-A and p-tert-butylphenol was used in an amount of 113 g in place of 81 g.

The PC-PDMS copolymers $A_1$ to $A_4$ that were obtained in the Preparation Examples 3-1 to 3-4 were each dried overnight at 120° C. and then pelletized by means of an extruder at 280° C. Each of the pellets thus obtained was measured for chain length of PDMS, content of PDMS and viscosity-average molecular weight (Mv) to evaluate the physical properties of the copolymer. The measuring methods are explained in the following and the measurement results are given in Table 1.

(1) Chain length of PDMS (n: dimethylsilanoxy unit)

Chain length of PDMS was obtained from the ratio of the peak of methyl group of dimethylsiloxane observed at 0.2 ppm to the peak of methylene group of PC-PDMS linkage part observed at 2.6 ppm in $^1$H-NMR.

(2) Content of PDMS

Content of PDMS was obtained from the ratio of the peak of methyl group in isopropyl group of bisphenol A observed at 1.7 ppm to the peak of methyl group of dimethylsiloxane observed at 0.2 ppm in $^1$H-NMR.

(3) Viscosity-average molecular weight (Mv)

A measurement was made of the viscosity of a solution of the copolymer in methylene chloride at 20° C. by using a Ubelhode viscometer to obtain intrinsic viscosity [η], which was used to calculate Mv by the following formula.

$$[\eta]=1.23\times 10^{-5} Mv^{0.83}$$

TABLE 1

| PC-PDMS Copolymer | Chain Length of PDMS (n) | Content of PDMS (% by weight) | Viscosity-average Molecular Weight (Mv) |
|---|---|---|---|
| $A_1$ | 30 | 4.0 | 20,000 |
| $A_2$ | 30 | 4.0 | 15,000 |

TABLE 1-continued

| PC-PDMS Copolymer | Chain Length of PDMS (n) | Content of PDMS (% by weight) | Viscosity-average Molecular Weight (Mv) |
|---|---|---|---|
| $A_3$ | 30 | 1.0 | 15,000 |
| $A_4$ | 150 | 4.0 | 15,000 |

EXAMPLE 1 TO 4 AND COMPARATIVE EXAMPLE 1 TO 6

Each of the PC-PDMS copolymers $A_1$ to $A_4$ that were obtained in the Preparation Examples 3-1 to 3-4, polycarbonate resin, PTFE, and cryolite ($Na_3AlF_6$) as an alkali metal salt, each available on the market were blended at any of the blend ratios as shown in Table 2, and the resultant blend was kneaded at 280° C. into pellet by the use of a twin-screw vented extruder (produced by Toshiba Machine Co., Ltd. Model: TEM-35B)

The details of the raw materials are as follows.

(A) Polycarbonate (PC) resin $B_1$: Idemitsu Polycarbonate A 2200 (a product by Idemitsu Petrochemical Co., Ltd.; Mv=21,000)

$B_2$: Idemitsu Polycarbonate A 1500 (a product by Idemitsu Petrochemical Co., Ltd.; Mv-15,000)

(B) PTFE $C_1$: Algoflon F5 (a product by MonTefluos Co., Ltd.) with fibril forming capability $C_2$: Lublon L5 (a product by Daikin Industries Ltd. without fibril forming capability)

(C) Polydimethylsiloxane $D_1$: SH200 (a product by Dow Corning Toray Silicone Co., Ltd.)

(D) Cryolite $E_1$: $Na_3AlF_6$ (a product by Aldrich Co., Ltd.)

TABLE 2

| | PC-PDMS Copolymer | | Polycarbonate Resin | |
|---|---|---|---|---|
| | Kind | Blending Amount (% by weight) | Kind | Blending Amount (% by weight) |
| Example 1 | $A_1$ | 37.5 | $B_1$ | 62.5 |
| Example 2 | $A_2$ | 20.0 | $B_2$ | 80.0 |
| Example 3 | $A_3$ | 100.0 | — | — |
| Example 4 | $A_4$ | 12.5 | $B_2$ | 87.5 |
| Comp. * Example 1 | — | — | $B_2$ | 100.0 |
| Comp. Example 2 | $A_2$ | 20.0 | $B_2$ | 80.0 |
| Comp. Example 3 | — | — | $B_2$ | 100.0 |
| Comp. Example 4 | $A_2$ | 2.0 | $B_2$ | 98.0 |
| Comp. Example 5 | $A_2$ | 75.0 | $B_2$ | 25.0 |
| Comp. Example 6 | $A_2$ | 20.0 | $B_2$ | 80.0 |
| Comp. Example 7 | $A_3$ | 100.0 | — | — |

TABLE 2-continued

| | Content of PDMS in PC-PDMS/ PC-Resin (% by weight) | PTFE Kind | PTFE Blending Amount (% by weight) | Polydimethyl- siloxane ($D_1$) Blending Amount (% by weight) | Cryolite ($E_1$) Blending Amount (% by weight) |
|---|---|---|---|---|---|
| Example 1 | 1.5 | $C_1$ | 0.05 | — | — |
| Example 2 | 0.8 | $C_1$ | 0.1 | — | — |
| Example 3 | 1.0 | $C_1$ | 0.3 | — | — |
| Example 4 | 0.5 | $C_1$ | 0.8 | — | — |
| Comp. Example 1 | 0 | $C_1$ | 0.3 | — | — |
| Comp. Example 2 | 0.8 | — | — | — | — |
| Comp. Example 3 | 0 | $C_1$ | 0.3 | 1.0 | — |
| Comp. Example 4 | 0.08 | $C_1$ | 0.3 | — | — |
| Comp. Example 5 | 3.0 | $C_1$ | 0.3 | — | — |
| Comp. Example 6 | 0.8 | $C_1$ | 0.1 | — | — |
| Comp. Example 7 | 1.0 | $C_1$ | 0.3 | — | 0.4 |

* Comp. means "Comparative"

The pellets thus obtained were dried at 120° C. for 5 hours and then injection molded at a molding temperature of 280° C. and a mold temperature of 80° C. to prepare combustion test bars by the use of an injection molding machine (produced by Toshiba Machine Co., Ltd. Model: IS 100 EN). The resultant bars were made into flat sheets ($140^{mm} \times 140^{mm} \times 3.2^{mm}$) for the evaluation of surface appearance and long-term heat resistance by using a Sumitomo Nestal N515/150 (a product of Sumitomo Heavy Machinery Co., Ltd.) at a molding temperature of 300° C. and a mold temperature of 80° C.

Measurements were made of oxygen index, flame retardancy, surface appearance, long-term heat resistance and melt flow index to evaluate the quality of the test pieces that were obtained per each of the examples and comparative examples. The measuring methods are explained in the following and the measurement results are given in Table 3.

(1) Oxygen index

According to JIS K 7201, an oxygen index is obtained by a method in which an ignition source is brought close from above to a sample in a combustion tube in which oxygen/nitrogen ratio is varied and a minimum ratio at which the combustion continues for at least 3 minutes is regarded as the oxygen index.

(2) Flame retardancy

According to UL 94 Standard, Underwriters Laboratory Subject 94, samples having a thickness of 1.5 mm and 1.0 mm, respectively are subjected to vertical combustion test to determine flame retardancy.

(3) Melt flow index

According to JIS K 7210, melt flow index is measured at a temperature of 280° C. under a load of 160 kg.

(4) Surface appearance

The flat sheets ($140^{mm} \times 140^{mm} \times 3.2^{mm}$) that had been prepared by molding at a molding temperature of 300° C. were visually observed for checking a silver streak.

(5) Long-term heat resistance

The flat sheets ($140^{mm} \times 140^{mm} \times 3.2^{mm}$) that had been prepared by molding at a molding temperature of 300° C. were allowed to stand at 140° C. for 1000 hours in a high temperature oven PHH-200 (a product by Tabai Co., Ltd.) and were compared with the molded flat sheets immediately after the molding (zero time lapse) in terms of the hue difference (Difference of Yellow Index: ΔYI). The Yellow Index (YI) was determined according to JIS K 7105. (Testing methods for optical properties of plastics.)

TABLE 3

| | Oxygen Index | Flame Retardancy (UL 94) Thickness 1.5 mm | Flame Retardancy (UL 94) Thickness 1.0 min | Melt flow Index (× 10⁻² ml/sec) | Surface Appearance (Silver Streak) | Long-term Heat Resistance (ΔYI) |
|---|---|---|---|---|---|---|
| Example 1 | 34 | V-0 | V-0 | 5.8 | No | 10.8 |
| Example 2 | 36 | V-0 | V-1 | 38.9 | No | 11.0 |
| Example 3 | 36 | V-0 | V-1 | 41.4 | No | 10.3 |
| Example 4 | 35 | V-0 | V-1 | 43.5 | No | 11.0 |
| Comp. Example 1 | 27 | V-2* | V-2* | 42.1 | No | 11.2 |
| Comp. Example 2 | 36 | V-2 | V-2 | 39.0 | No | 11.0 |
| Comp. Example 3 | 27 | V-2* | V-2* | 43.5 | No | 11.2 |
| Comp. Example 4 | 29 | V-2* | V-2* | 39.5 | No | 11.1 |
| Comp. Example 5 | 31 | V-2* | V-2* | 38.5 | No | 10.5 |
| Comp. Example 6 | 36 | V-2 | V-2 | 41.5 | No | 10.9 |
| Comp. Example 7 | 36 | V-0 | V-1 | 41.0 | Yes | 17.0 |

* Comp. means "Comparative"
Remarks: V-2*; Disqualified in V-2

Remarks: V-2*; Disqualified in V-2

As can be seen from Table 3, high flame retardancy is obtained from the examples in which the content of PDMS in PC-PDMS copolymer/polycarbonate resin is 0.1 to 2.0% by weight, and at the same time, the content of PTFE is 0.05 to 1.0 part by weight. In addition, excellent fluidity is obtained from Examples 2 to 4.

On the other hand, desired flame retardancy is not obtained from any of Comparative Examples 1 to 6 because of the failure to satisfy at least one of the indispensable constitutions of the present invention.

That is to say, Comparative Example 1 is rejected because of its low oxygen index and unacceptable V-2 for both 1.5 mm and 1.0 mm thickness.

Comparative Example 2 is rejected because of its failure to exert melt-dripping preventive effect due to lack of PTFE and attain V-0.

Comparative Example 3, which relates to a mixture of a PC resin and polydimethylsiloxane, shows low oxygen index and can not achieve flame retardancy.

It is understood that improvement in oxygen index is recognized only in the case where the PC-PDMS copolymer according to the present invention is employed.

Comparative Examples 4 and 5 showing examples in which the content of PDMS is outside the prescribed range, show little improvement of oxygen index, thus failing to achieve desired flame retardancy.

Comparative Example 6 showing an example which employs PTFE without fibril forming capability, can not prevent melt dripping, thus failing to assure V-0.

Comparative Example 7, which relates to a composition obtained by adding an alkali metal salt to the composition in Example 3 (refer to Japanese Patent Application Laid-Open No. 200862/1991) fails to attain compatibility between the base PC polymer and the alkali metal salt and causes a silver streak and furthermore, is poor in long-term heat resistance as well as an extreme hue change.

What is claimed is:

1. A polycarbonate resin composition which comprises a (A) polycarbonate-polyorganosiloxane copolymer in which the carbonate component of the polycarbonate has the formula;

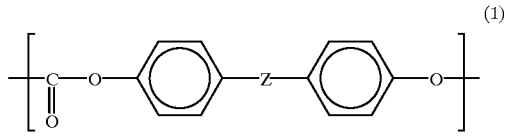

wherein Z is a $C_{1-8}$ alkylene group, a $C_{2-8}$ alkylidene group, a $C_{5-15}$ cycloalkylene group, a cycloalkylidene group, $-SO_2-$, $-SO-$, $-S-$, $-O-$, $-CO-$ or a structure of formula (2)

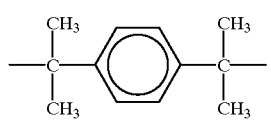

or of formula (2')

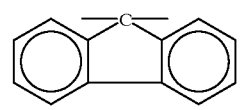

and in which the polyorganosiloxane component has the formula:

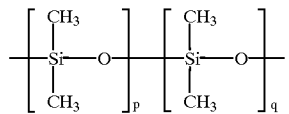

wherein p and q are each 0 or an integer of at least and wherein prior to coppolymerization said polyorganosiloxane has been terminated by the addition reaction of 2-allylphenol to Si—H terminal bonds; a (B) polycarbonate resin and a (C) polytetrafluoroethylene having fibril forming capacity, wherein the amount of component (A) in the composition is 5–100% by weight based on the total amount of components (A) and (B), the amount of component (B) is 95-0% by weight based on the total amount of the components (A) and (B), the amount of the polyorganosiloxane moiety present in component (A) is 0.5–1.5% by weight based on the total amounts of components (A) and (B) and the amount of component (C) is 0.05–1.0 part by weight, based on 100 parts by weight of the total amounts of components (A) and (B).

2. The polycarbonate resin composition according to claim 1 wherein the amount of the component (A) is 10 to 100% by weight based on the total amount of the components (A) and (B) and the amount of the component (B) is 90 to 0% by weight based on the total amount of the components (A) and (B).

3. The polycarbonate resin composition according to claim 1 wherein the amount of the component (C) is 0.1 to 0.5 part by weight based on 100 parts by weight of the total amount of the components (A) and (B).

4. The polycarbonate resin composition according to claim 1 wherein the polycarbonate-polyorganosiloxane copolymer is a block copolymer having a viscosity-average molecular weight of 10,000 to 40,000.

5. The polycarbonate resin composition according to claim 1 wherein the polytetrafluoroethylene has an average molecular weight of 500,000 to 10,000,000.

6. The polycarbonate resin composition according to claim 1 which further comprises at least one member selected from the group consisting of inorganic fillers, synthetic resins other than the component (A) or component (B), elastomers, antioxidants, ultraviolet absorbers, lubricants, mold release agents, antistatic agents and coloring agents.

7. The polycarbonate resin composition according to claim 1, wherein the degree of polymerization of the polycarbonate moiety of component (A) is 3–100 and the degree of polymerization of the polyorganosiloxane moiety of component (A) is 2–500.

* * * * *

UNITED STATES PATENT AND TRADEMARK OFFICE
CERTIFICATE OF CORRECTION

PATENT NO. : 6,001,929

DATED : December 14, 1999

INVENTOR(S): Akio NODERA et al

It is certified that an error appears in the above-identified patent and that said Letters Patent is hereby corrected as shown below:

Column 12, line 40, "2-allylphenol" should read --allylphenol--.

Signed and Sealed this

Fifteenth Day of May, 2001

*Attest:*

NICHOLAS P. GODICI

*Attesting Officer*   *Acting Director of the United States Patent and Trademark Office*